July 6, 1965     T. W. HUFFMAN, JR., ETAL     3,193,262
APPARATUS FOR REPAIRING RADIATOR CORES
Filed July 19, 1962     4 Sheets-Sheet 1

INVENTORS
Thomas W. Huffman, Sr.
Thomas W. Huffman, Jr.

BY *Cecil L. Rood*

ATTORNEY

July 6, 1965     T. W. HUFFMAN, JR., ETAL     3,193,262
APPARATUS FOR REPAIRING RADIATOR CORES
Filed July 19, 1962     4 Sheets-Sheet 2
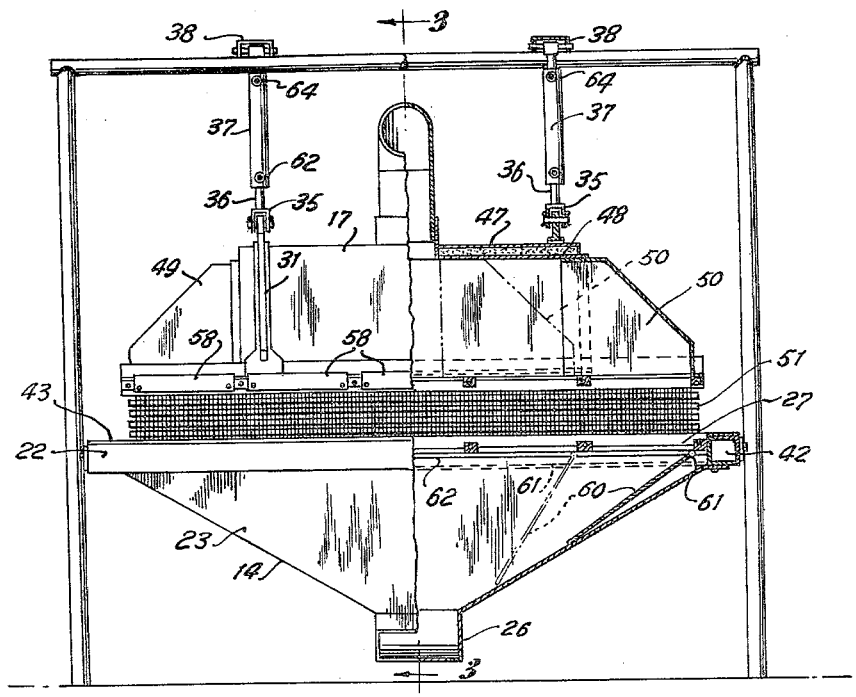
INVENTORS
Thomas W. Huffman, Sr.
Thomas W. Huffman, Jr.
BY
ATTORNEY INVENTORS
Thomas W. Huffman, Sr.
Thomas W. Huffman, Jr.

BY *Cecil C. Wood*

ATTORNEY

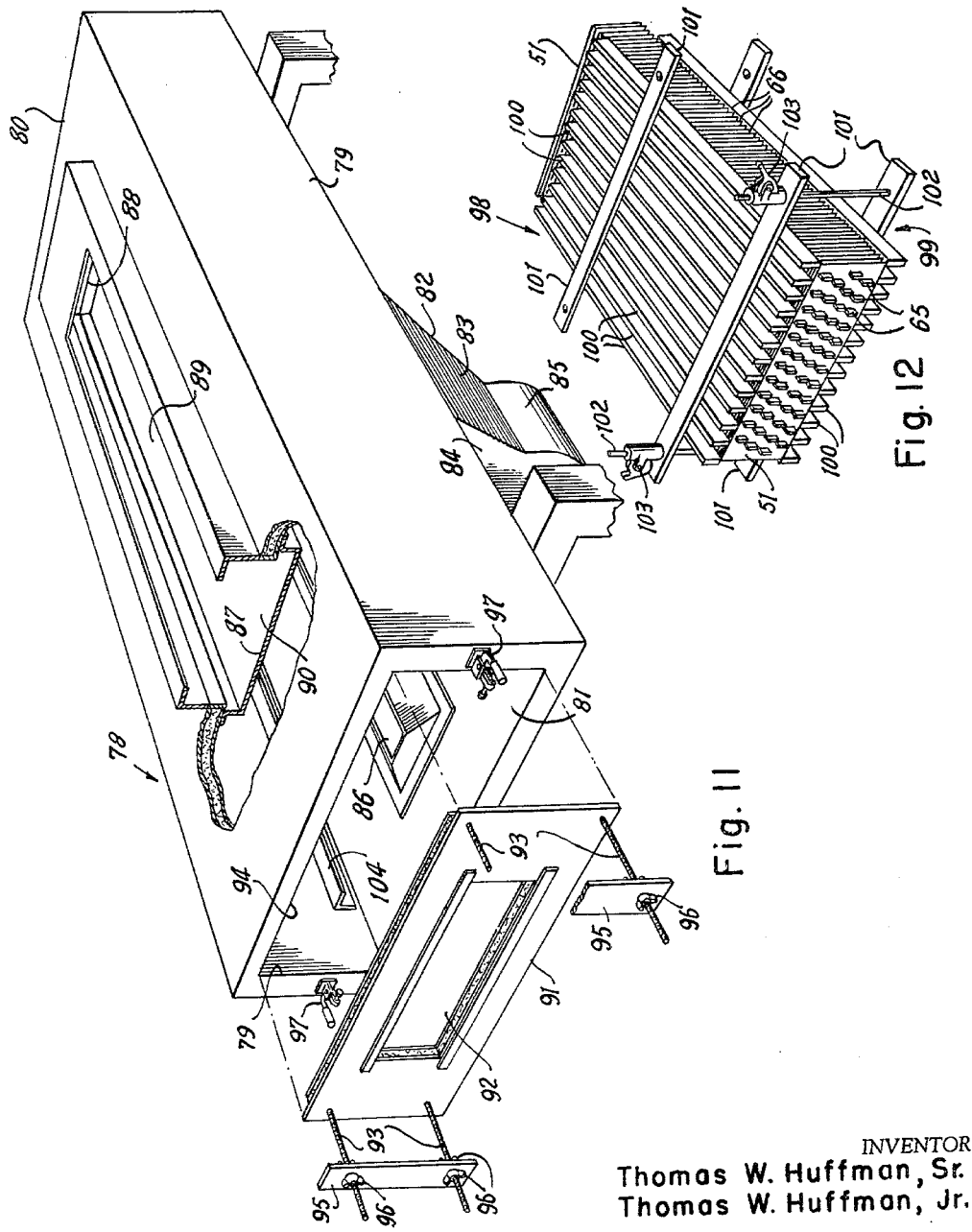

United States Patent Office 3,193,262
Patented July 6, 1965

3,193,262
APPARATUS FOR REPAIRING RADIATOR CORES
Thomas W. Huffman, Jr., and Thomas W. Huffman, Sr.,
both of 1821 N. Sam Houston, Odessa, Tex.
Filed July 19, 1962, Ser. No. 210,926
2 Claims. (Cl. 263—2)

This invention relates to apparatus and method for reparing radiator cores in cooling systems for internal combustion engines, and it has particular reference to the art of replacing damaged flow tubes without dismantling the core, or separating the transverse laminal of fins through which the tubes are arranged whereby to effect a transference or exchange of temperatures between the fluids passing through the tubes and across the fins.

Several types of core structures are commonly used in automotive cooling systems, and those of more substantial construction and greater volume, such as employed in large industrial engines, but the most common of these cores are in two categories, i.e., the type in which the fins are arranged horizontally in relatively closely spaced parallel relationship and have the transverse flat flow tubes penetrating the fins at predetermined spacing, and in spaced rows, and the type in which the flat flow tubes, in vertical spaced alignment, are separated by cooling elements on fins which are comprised of relatively thin metal strips formed in accordion plaits and joined to the flat surfaces of the tubes by soldering to form the core.

Both of the above mentioned types of heat exchanger cores can be repaired or assembled by use of the apparatus and method of the invention, but one of its objects is that of affording an easy and economical means for replacing damaged or impaired flow tubes in the first mentioned type of core by removing the old tubes and inserting new ones without disturbing the arrangement of the aligned fins.

In this type of core the fins or laminae, which consist of relatively thin sheets of conductive metal, are arranged in relatively close parallel spacing and perforated to receive the flow tubes therethrough in parallel spaced rows, which are generally staggered or offset from each other, and the fins are joined to the tubes by soldering to form an integral structure. However, these tubes can be withdrawn and replaced in an operation through the use of the invention without disarranging or damaging the fins.

An object of the invention is that of providing apparatus whereby heat exchanger cores of different dimensions or thicknesses can be renewed or restored, or completely rebuilt, at costs substantially less than that of new cores.

A further object of the invention resides in the provision of apparatus by which all or portions of a radiator core can be subjected to a sufficient degree of heat to break the solder bond between the fins and flow tubes whereby all or specific sections of the core can be repaired or reconditioned by the replacement of damaged flow tubes without affecting adjacent parts.

Broadly, the invention contemplates the provision of apparatus of simple and inexpensive design and operation wherein radiator cores of different types and sizes can be secured and the parts economically and quickly replaced without damaging the cooling fins, or in which the fins and flow tubes of certain types of cores can be separated and the fins assembled with new flow tubes.

While the foregoing objects are paramount, other and lesser objects will become apparent as the description proceeds taken in connection with the appended drawings wherein:

FIGURE 2 is a side elevational view of the oven assembly and air control mechanism, portions of which are shown in longitudinal section.

FIGURE 3 is a front end view of the oven assembly and grids, shown partially in vertical section, on line 3—3 of FIGURE 2, and showing a radiator core in position on the core table.

FIGURE 4 is a fragmentary elevational view of one of the upper grid slides.

FIGURE 5 is a fragmentary transverse sectional view, on line 5—5 of FIGURE 4, showing the upper grid and one of the slides.

FIGURE 11 is a perspective exploded illustration of a modified oven showing the adjustable end closure, and showing cut-away portions to illustrate the interior structure, and FIGURE 12 is a perspective illustration of a radiator core clamped between upper and lower grids preparatory to being inserted in the oven shown in FIGURE 11.

Figure 9:
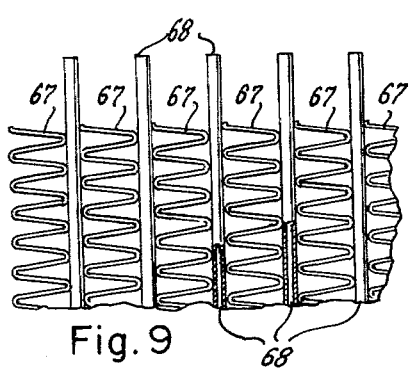
FIGURE 9 is a fragmentary illustration of a radiator core having flat flow tubes and plaited fins therebetween.
Figure 10:
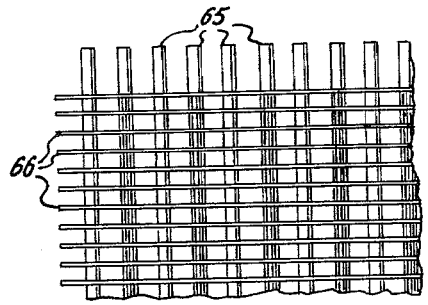
FIGURE 10 is a fragmentary illustration of a radiator core having flat flow tubes extended through parallel spaced fins, as also shown in FIGURES 2, 3 and 8.

The types of radiator cores specifically referred to above are illustrated, respectively, in FIGURES 10 and 9, and while the invention is concerned with the repair and reconstruction of both types, the structure shown in FIGURE 10 is more commonly used in industrial cooling systems such as in the larger types of engines employed in oil well drilling rigs and heavy industrial machinery, such as tractors, cranes, shovels and the like.

Figure 1:
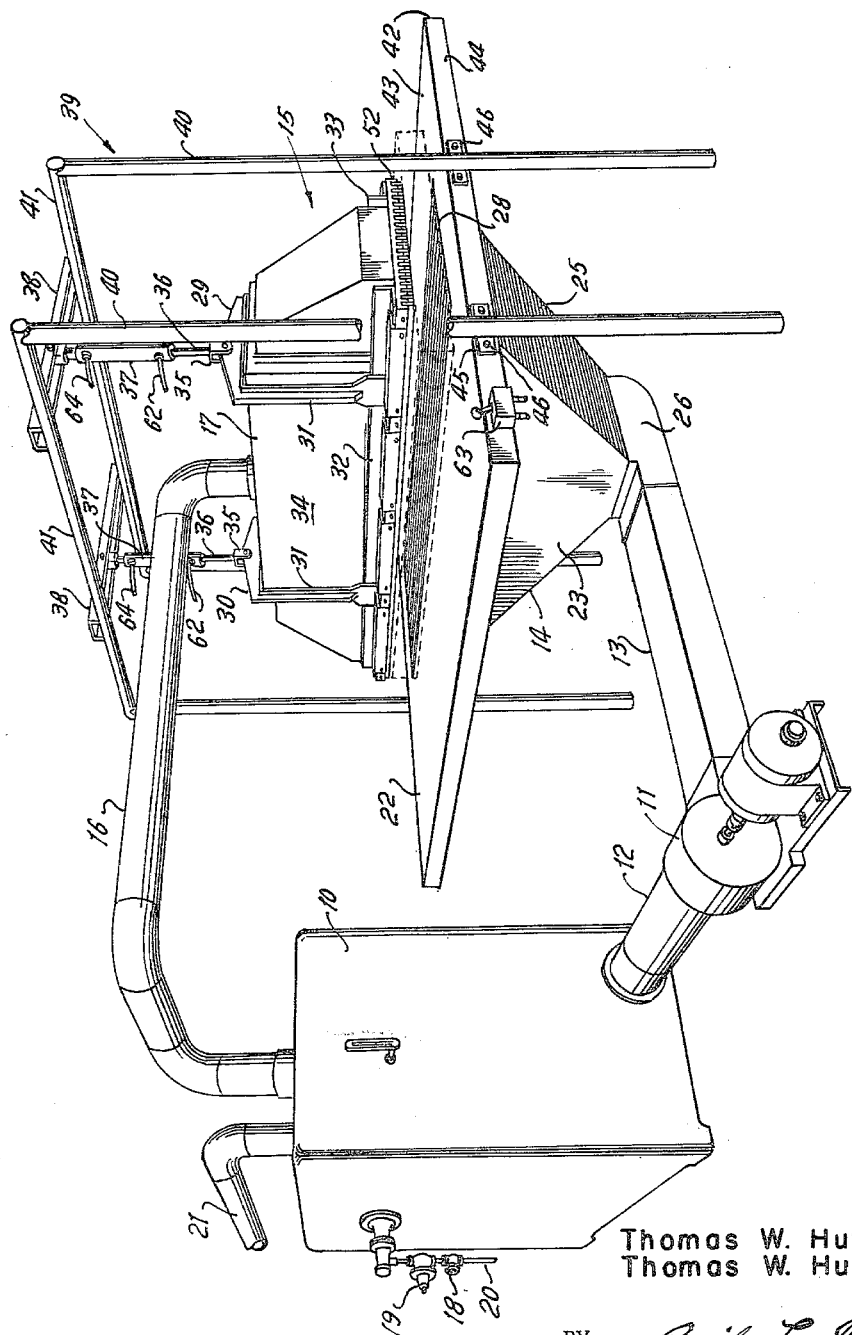
FIGURE 1 is a perspective illustration of apparatus embodying the invention, and shows the heater unit ducts, blower element, upper and lower oven elements, and air control mechanism.

The invention, therefore, in its broadest sense, includes a heater unit or fire box 10 in which gas, or other suitable fuel, is employed to generate hot air to be transmitted by means of a blower type fan 11 through ducts 12 and 13 to the lower section 14 of the oven, generally designated as 15, as shown in FIGURE 1. A return duct 16 is connected between the upper section 17 of the oven 15 and the heater unit 10. Suitable fuel control elements such as a valve 18 and a regulator 19 are connected in the fuel supply line 20 to the heater unit 10. Air is drawn into the heater unit 10 through a supply duct 21.

The lower section 14 of the oven 15 is suspended beneath a table 22 and is arranged centrally thereof, as shown in FIGURES 1, 2 and 3, and while the sides 23 are perpendicular to the top surface 24 of the table 22, the ends 25 incline inwardly forming a throat 26 to which the air inlet duct 13 is connected, as illustrated in FIGURES 1, 2 and 3. The lower section 14 of the oven 15 is rectangular in plan and a rectangular opening 27 therefor is provided in the table 22 in which a grid 28 is arranged which comprises a series of laterally spaced bars 28' supported longitudinally of the opening 27.

The upper section 17 of the oven 15 is suspended by a pair of yoke members 29 and 30 whose legs 31 are attached at their lowermost ends to angle bars 32 and 33 arranged along the lower edge of each side wall 34 of the section 17. Each yoke member 29 and 30 is supported by a clevis 35 embracing the lateral portions thereof intermediate the legs 31, the clevises 35 being attached to the lowermost ends of rods 36 of a pair of air cylinders 37 whose upper ends are pivotally connected to bars 38 arranged across the super-frame structure 39 comprising paired vertical tubular members 40 and horizontal members 41, as shown in FIGURES 1, 2 and 3.

The table 22 is comprised of a rectangular frame formed of angle bars 42 having a relatively heavy gauge metal surface 43 supported thereon. The table frame is supported at each end on angle bars 44 secured to plates 45 by bolts 46, or other device. The plates 45 are welded to the inner sides of the vertical members 40 and 41 of the super-frame structure, as best shown in FIGURES 2 and 3.

The top 47 of the section 17 is flat and the bottom is open. The top 47 and side walls 34 are of relatively heavy gauge metal plate spaced to provide for an insulating material 48, as shown in FIGURES 2 and 3. The end members 49 and 50 have telescoping association with the section 17 and are adapted to be moved inwardly and outwardly at each end, as illustrated in FIGURE 2, to cover cores 51 of different lengths or dimensions which are supported on the grid 28 in the table opening 27.

A similar grid 52 is attached to the bottom of the upper section 17 and is shown in FIGURES 1, 3 and 5. The grid 52 is comprised of a series of spaced bars 53 arranged longitudinally of the section 17 and secured by rods 54 extending longitudinally through transverse members 55 spaced along the section 17, as shown fragmentarily in detail in FIGURE 4.

Each of the members 55 has a series of spaced transverse slots 56 formed therein to receive the bars 53 and retain them in alignment. The ends of the bars 53 are secured by screws 57, or other suitable device, to the depending flanges of a series of bars 58, angular in transverse section, by which the grid 52 is supported on the section 17 of the oven 15, as shown in FIGURES 1, 2, 3 and 4. The upper or horizontal flanges of the bars 58 slidably engage the lower extending flanges of the angular bars 32 and 33 secured along the lower edges of the side walls 34 of the section 17 and to which the legs 31 of the yoke members 30 are attached, as shown in FIGURES 1, 2 and 3. The end members 49 and 50 of the upper section 17 are adapted to be moved between the bars 32 and 33 on the grid 52 to adjust them with respect to the member 17 so as to concentrate the application of hot air to the core 51, as indicated in FIGURE 2.

The lower section 14 of the oven 15 has a pair of baffle members 60 hingedly supported transversely thereof on rods 61 whose ends extend through slots 62 formed along each upper edge of the walls 23 of the section 14, as shown in FIGURES 2 and 3, and are capable of adjustment longitudinally of the section 14, in the manner shown in broken lines in FIGURE 2, to correspond to the positioning of the end members 49 and 50 whose adjusted positions are depicted by broken lines in FIGURE 2. With such an arrangement cores of different dimensions can be properly heated without loss of heat which is circulated through the duct 13, the oven 15 and back to the heater unit 10.

In the operation of the mechanism, a core 51, such as that shown in FIGURES 9, 10 and 12, can be arranged over the grid 28, in the manner shown in dotted lines in FIGURE 1, or in FIGURES 2 and 3, by first elevating the upper section 17, with its grid 52, by air pressure introduced to the lower ends of the cylinders 37 through flexible tubes 62 and controlled by a manual valve 63 attached to the table 22, as illustrated in FIGURE 1. By reversing the valve 63, air enters the upper ends of the cylinders 37 through flexible tubes 64 to lower the upper section 17 on the core 51.

Heat exchanger units, such as the cores illustrated, are made in a variety of dimensions for a variety of applications, such as for conventional automobile or truck radiators, or for large industrial engines. Some of the cores may be relatively long and narrow and in which case the end members 49 and 50 of the upper section 17 are adjusted longitudinally thereof and the baffles 60, in the lower section 14, are appropriately adjusted. By this arrangement all or any portion of the core can be exposed to the hot air circulation, depending upon the lateral dimensions of the core. The upper section 17 is raised or lowered according to the thickness of the core.

As previously stated, there are two types of cores which are most commonly used. The type shown in FIGURES 2, 3, 8, 10 and 12, in which the flat tubes 65 extend through a series of parallel spaced laminae 66 is most substantial and is probably more commonly used than the type shown in FIGURE 9 which comprises a folded or plaited type of fin 67 interposed between and soldered to parallel tubes 68. In the latter type the integrity of the structure depends upon the solder bond between the fins and the tubes.

Figure 8:
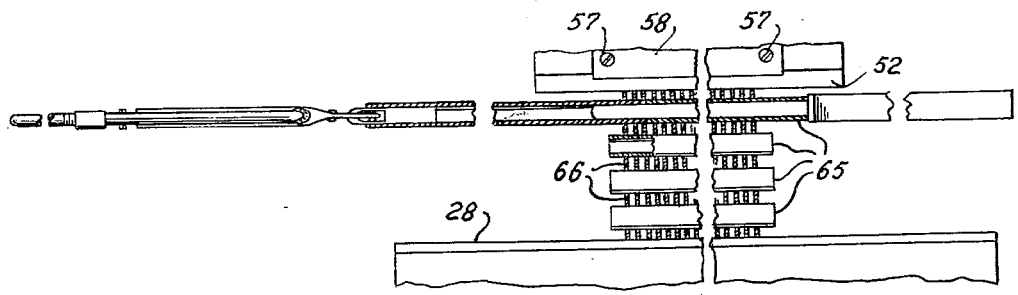
FIGURE 8 is a fragmentary vertical sectional view of a radiator core secured between the upper and lower grids and oven sections and illustrating the application of the tools shown in FIGURES 6 and 7.

In replacing the tubes 65 of the core structure shown in FIGURES 8, 9 and 12 the core 51 is secured on the table 22 in the manner shown in FIGURES 1, 2, 3 and 8 and, depending upon its dimensions, the end members 49 and 50 of the upper oven section 17 are adjusted. The baffles 60 are positioned accordingly and heated air, having a temperature sufficient to melt the solder bond between the tubes 65 and the fins 66 is passed through the oven so that the tubes 65 can be individually withdrawn from the fins 66, which are rigidly secured between the grids 28 and 52, and replaced. Special tools for withdrawing the tubes 65 and inserting the same are illustrated, respectively, in FIGURES 6 and 7, and will be presently described in detail.

In FIGURE 8 is shown the rigid manner in which the core is held in position between the stationary grid 28 in the table 22 and the upper vertically adjustable grid 52 in the upper section 17 of the oven 15. When the solder bond between the tubes and fins has been relaxed by the circulation of heated air through the core, the tubes 65 can be removed, one or more at a time, without disturbing the arrangement of the fins 66 and replaced by inserting a new tube through the series of apertures in the fins 66.

Figures 6, 7:
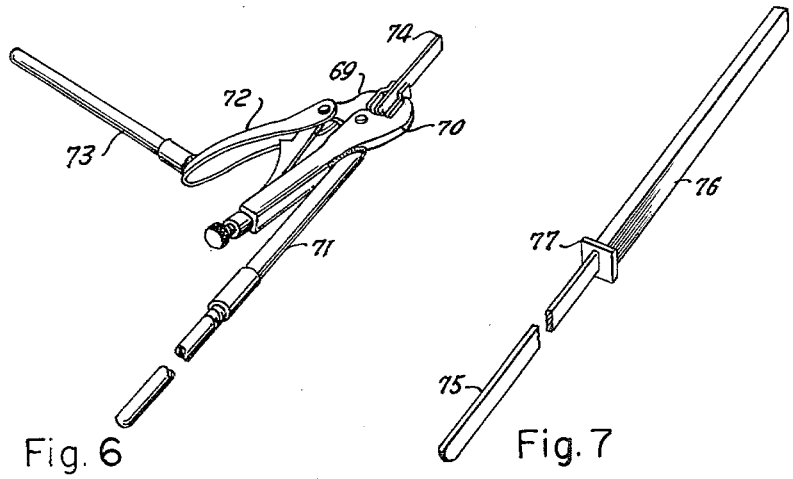
FIGURE 6 is a perspective illustration of a tube withdrawal tool.
FIGURE 7 is a perspective illustration of a tube inserter tool.

The operation is performed by the use of the tool shown in FIGURE 6, which has a pair of jaws 69 and 70 and a handle 71 rigidly attached to the latter. The jaw 69 is hinged to the jaw 70 and has a clamping member 72 pivoted thereto having a right angular handle 73 for manipulating the jaw 69 with respect to the jaw 70. The jaws 69 and 70 have a tongue 74 therebetween which is adapted to extend into a tube 65 while the jaws 69 and 70 are clamped thereon and locked whereby the tube can be firmly gripped and pulled from the core from one end of the table 22. At the same time, the inserting tool shown in FIGURE 7 is used at the opposite end of the table 22 to insert a new tube.

The inserting tool comprises a blade 75 having a handle 76 and a guard 77 adjacent to the handle 76, as shown in FIGURES 7 and 8. The blade 75 is inserted into the tube 65, and being of slightly less dimensions than the internal dimensions of the tube, the latter can be thrust through the aligned apertures of the fins 66 in the wake of the tube being withdrawn. All or any number of the tubes 65 can thus be replaced without disarranging the fins 66, and by cooling the core the solder bond can be restored to integrate the core. The operations described are illustrated in FIGURE 8.

In FIGURE 11 is illustrated a modified form of oven, generally designated as 78, which comprises a housing having parallel vertical side walls 79 and top and bottom members 80 and 81. Connected to the bottom 80 is an air outlet duct 82 having opposing inclined side members 83 and vertical end members 84, providing a structure similar to the lower section 14 of the oven 15, illustrated in FIGURES 1, 2 and 3. The air duct 13 is connected to the throat 85 which is similar in structure to the member 26 of FIGURES 1, 2 and 3.

The bottom 81 of the oven 78 has a baffled or restricted opening 86 longitudinally thereof and intermediate the side walls 79 to admit air thereinto which passes upwardly through the ends 87 and 88 of an air passage 89 arranged in the top 80 of the oven 78 and formed by a pan 90 depending from the sides of a longitudinal opening in the top 80. The top 80, bottom 81 and the sides 79 of the oven 78 are preferably insulated, as shown in the cutaway portion of FIGURE 11.

The front of the oven 79 is closed by a closure 91, which is also double-walled and insulated, and has an opening 92 centrally thereof. The closure 91 is slidably supported on a plurality of threaded rods 93, each arranged through a corner of the closure 91, whereby the latter, when fixed in the opening 94 of the front wall of the oven 78, can be adjusted inwardly into the oven, as desired, and depending upon the dimension of the core 51 inserted therein. A plate 95 is attached to each pair of rods 93 and is adjustable thereon by winged nuts 96 whereby to properly position the closure in the oven 76 with respect to the end of the core deposited therein. The closure 91 is secured in the opening 94 by latch members 97 which engage the plates 95.

In FIGURE 12 is illustrated a core 51 which is clamped between a pair of grid members 98 and 99, each of the latter comprising a series of laterally spaced bars 100 secured to transverse bars 101 which extend beyond the sides of the grid 98 and 99 and are connected by rods 102 which are provided with clamp members 103 whereby the core 51 is secured while being deposited in the oven 78 and treated to release the tubes 65 from the fins 66. The core 51, when clamped between the grids 98 and 99, is slidably inserted into the oven 78 on the angular bars 104 arranged along each inner wall of the oven 78. The tubes 65 can be removed from the fins 66 through the opening 92 in the closure 91.

The invention, although described in great detail, is obviously capable of certain changes and modifications in structure and design, by persons skilled in the art, without departing from the spirit of the invention or the scope of the appended claims.

What is claimed is:

1. In apparatus for repairing heat exchanger cores having spaced parallel fins and water flow tubes bonded to and traversing said fins, in combination, a frame having a table rigidly supported therein for supporting a heat exchanger core, the said table having a central opening and a grid in said opening, an oven having upper and lower sections supported in said frame, the said lower section being rigidly attached to said table and surrounding the opening therein and suspended therebelow, the said upper section of said oven being arranged in the upper portion of said frame above said table, hydraulic means supporting said upper section and capable of operating said upper section vertically with respect to said table and engageable with a heat exchanger core thereon to rigidly secure the same thereto over said grid, means for circulating heated air through said upper and lower sections of said oven, and transversely through said core on said grid, to heat the said core to release the bond between the fins and tubes of said core whereby said tubes can be removed from said fins while said fins are rigidly secured by the upper section of said oven.

2. Apparatus for releasing the solder bond between the fins and flow tubes in a heat exchanger core whereby said tubes can be withdrawn from the fins without disarranging the said fins, in combination, a frame having a table rigidly supported therein, the said table having a central opening and a grid in said opening, an oven having upper and lower sections above and below said table, the said lower section being rigidly connected to said table and surrounding said opening therein and depending therebelow, the said upper section being arranged in said frame above said table and having hydraulic means thereon for raising and lowering the same with respect to said table and a heat exchanger core thereon, the said hydraulic means forcing said upper section in its lowermost position against said core and rigidly securing the same to said table, means for directing a stream of heated air through said oven and transversely through said core to release the solder bond between the fins and tubes in said core whereby said tubes can be removed from said fins while the latter are secured by said upper section of said oven.

References Cited by the Examiner
UNITED STATES PATENTS

| | | | |
|---|---|---|---|
| 2,046,115 | 6/36 | Gottlieb | 113—135 |
| 2,154,104 | 4/39 | Munch et al. | 113—135 |
| 2,160,633 | 5/39 | Young | 113—135 |
| 2,341,628 | 2/44 | Koweindl | 113—111 |
| 2,423,870 | 7/47 | Blessing | 29—455 |
| 2,944,504 | 7/60 | Herman et al. | 29—455 |
| 2,956,099 | 10/60 | Raynes | 113—99 XR |
| 3,064,118 | 11/62 | Bukata | 113—99 XR |

CHARLES W. LANHAM, *Primary Examiner.*

JOHN F. CAMPBELL, *Examiner.*